US007164996B2

(12) United States Patent
Lee (10) Patent No.: US 7,164,996 B2
(45) Date of Patent: Jan. 16, 2007

(54) POWER BREAKING APPARATUS FOR PREVENTION OF ELECTRICAL SHOCK

(76) Inventor: Heung-Sik Lee, A-301, Dongseung Villa, Janjidong 54-11, Gqangju-si, Gyeonggi-do, 464-070 (KR)

( * ) Notice: Subject to any disclaimer, the term of this patent is extended or adjusted under 35 U.S.C. 154(b) by 26 days.

(21) Appl. No.: 11/064,071

(22) Filed: Feb. 23, 2005

(65) Prior Publication Data
US 2006/0052956 A1    Mar. 9, 2006

(30) Foreign Application Priority Data
Aug. 17, 2004    (KR) .................. 10-2004-0064862

(51) Int. Cl.
*G06F 3/02*    (2006.01)
(52) U.S. Cl. ..................... 702/57; 702/58; 702/59; 702/62
(58) Field of Classification Search ............ 702/57–59, 702/65, 182, 183, 186, 189, 62; 136/244; 363/17; 324/522; 361/43, 115
See application file for complete search history.

(56) References Cited
U.S. PATENT DOCUMENTS

| | | | | |
|---|---|---|---|---|
| 4,864,479 A | * | 9/1989 | Steigerwald et al. | 363/17 |
| 5,170,310 A | * | 12/1992 | Studtmann et al. | 361/94 |
| 5,699,219 A | * | 12/1997 | Arita et al. | 361/43 |
| 6,295,190 B1 | * | 9/2001 | Rinaldi et al. | 361/115 |
| 6,421,618 B1 | * | 7/2002 | Kliman et al. | 702/58 |
| 6,812,396 B1 | * | 11/2004 | Makita et al. | 136/244 |
| 6,970,247 B1 | * | 11/2005 | Yankielun | 356/436 |

* cited by examiner

*Primary Examiner*—Marc S. Hoff
*Assistant Examiner*—Felix Suarez
(74) *Attorney, Agent, or Firm*—Ladas & Parry LLP (57) ABSTRACT

A power breaking apparatus for prevention of electrical shock breaks AC power supplied to electrical structures such as traffic lights, streetlights etc. if a leakage voltage is detected over a preset voltage or the electrical structures are inundated, thereby preventing electrical shock from inundation or leakage voltage. A plurality of inundation sensor rods of inundation sensing unit sense inundation of the metal posts. A plurality of leakage voltage sensor rods of the leakage voltage sensor sense leakage voltage. A power break signal generation unit generates ground current if the inundation sensing unit senses inundation or the leakage voltage sensor senses leakage voltage over a preset voltage and shots AC power to the ground if a predetermined time lapses. A zero phase sequence current transformers (ZCTs) detect the ground current. A leakage zero phase detector controls wiring breaker and a magnetic switch to break AC power according as the ZCTs detect ground current. The wiring breaker detects transient current to break AC power if the power break signal generation unit shorts AC power lines.

14 Claims, 7 Drawing Sheets

POWER BREAKING APPARATUS FOR PREVENTION OF ELECTRICAL SHOCK

BACKGROUND OF THE INVENTION

1. Field of the Invention

The present invention relates to techniques for prevention of electrical shock, and more particularly to a power breaking apparatus for protecting users against electrical shock by breaking power supplied to an electrical structure when leakage voltage occurs over predetermined voltage or the electrical structure is inundated.

2. Description of the Related Art

Generally, when there is leakage current or leakage voltage at electrical structures such as streetlights and traffic lights etc., industrial equipment used in factories and houses etc., appliances such as electric washing machines, refrigerators, etc., or such electrical structures, industrial equipment and electrical appliances are inundated by water, power supplied thereto must be cut to protect users against electrical shock.

Figure 1:
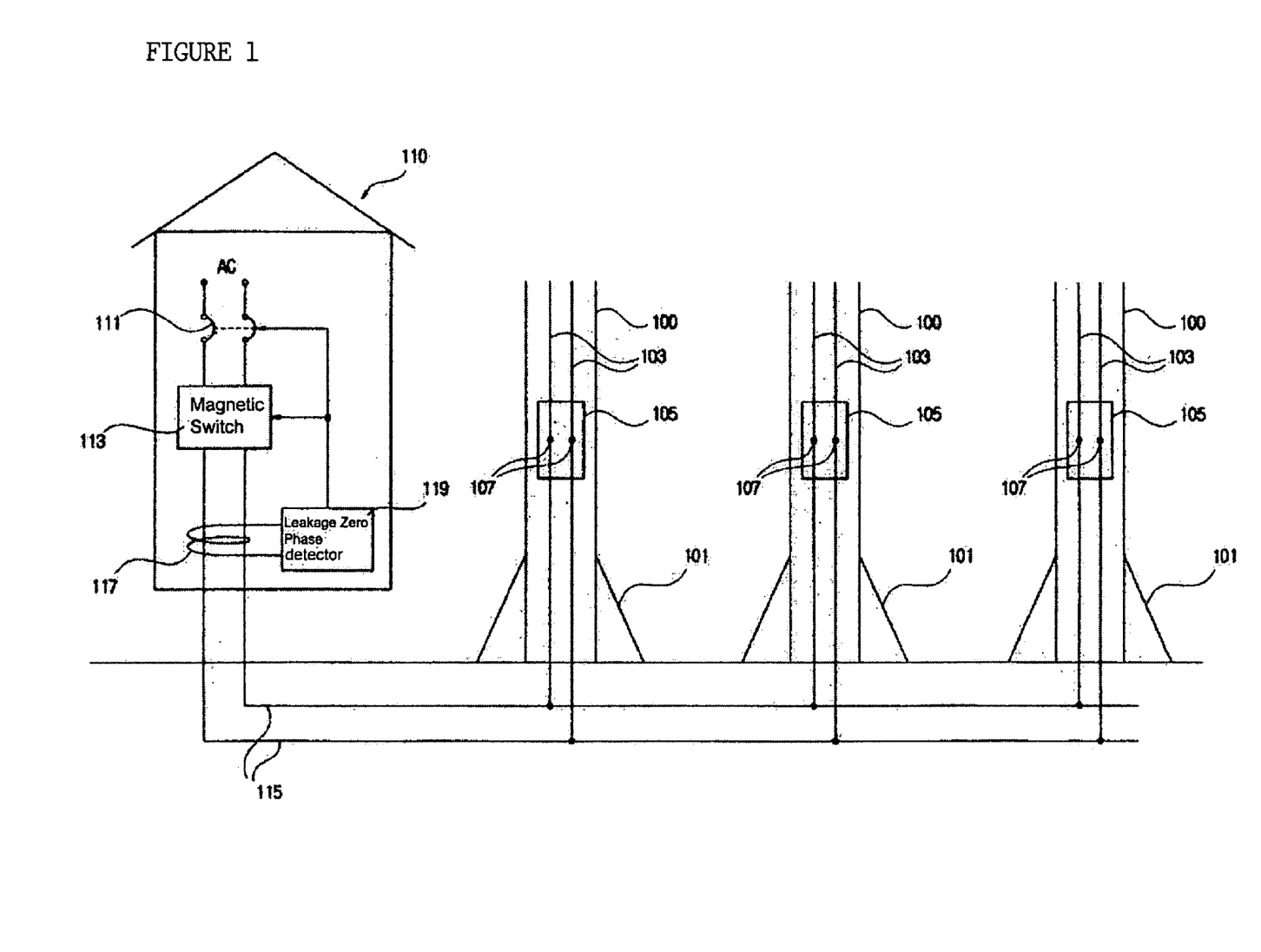
FIG. 1 illustrates the structure of the conventional ground current break apparatus.

A conventional power break apparatus capable of protecting users against electrical shock is disclosed in FIG. 1 when such streetlights and traffic lights are inundated by water. Namely, FIG. 1 illustrates the structure of the conventional ground current break apparatus. As shown in the drawing, a plurality of metal posts 100 is installed with a predetermined distance therebetween. Each of the plurality of metal posts is supported by a plurality of supporters at its lower part and has lamps (not shown) for displaying traffic lights or illuminating the street at its upper end.

Also, a controlling unit 110 for supplying AC power to the lamps of the plurality of metal posts 100 and controlling AC power thereto is separately installed from the plurality of metal posts 100.

The controlling unit 110 includes wiring breakers 111 and a magnetic switch 113 for automatically breaking AC power when a transient current occurs, power lines 115 for supplying AC power to the lamps of the plurality of metal posts 100, a zero phase current transformer (ZCT) 117 installed on the power lines 115 connected to output terminals of the magnetic switch 113 for outputting a leakage detection signal, a leakage zero phase detector 119 for controlling the wiring breakers 111 and the magnetic switch 113 to break AC power supplied to the lamps based on the leakage detection signal of the ZCT 117.

The controlling unit 110 is operated the following manner: The ZCT 117 detects a difference between currents flowing into the two power lines 115 when AC power supplied to the lamps of the plurality of metal posts 100 is leaked, and outputs the leakage detection signal indicative of leakage current. The leakage zero phase detector 119 controls the wiring breakers 111 and the magnetic switch 113 according to the leakage detection signal of the ZCT 117 such that AC power is not supplied to the lamps. Also, the wiring breaker 111 detects transient current when it flows to the lamps through the power lines 115, and then automatically breaks AC power. Therefore, the controlling unit 110 can immediately break AC power supplied to the metal post sides when there is a leak, thereby protecting users against electrical shock.

In such an electrical structure, the power lines 115 are typically laid under the ground from the controlling unit 110 to the lower part of the plurality of the metal posts 100. Meanwhile, other power lines 103, passing through space formed within each of the plurality of the metal posts, are used to connect the power lines 115 under the ground and the lamps installed at the upper end of the plurality of the metal posts. Therefore, AC power is supplied to the lamps from the wiring breakers 111 and the magnetic switch 113 through the power lines 115 and 103.

Meanwhile, in order to electrically connect the power lines 115 and the other power lines 103 to each other, there is provided a box 105 installed on a metal post 100 and located about 50 cm off the ground. Therefore, a worker can electrically connect the power lines 115 and 103 through the box and then tape the connection line parts 117 with an insulation tape. Event though the box 105 is installed about 50 cm off the ground, when the box 105 including the connection line parts 117 is inundated by flood etc., AC power may be leaked to water therefrom. Therefore, a passerby passing near the metal post from which AC power is leaked to water may be electrically shocked. Thus, the conventional controlling unit 110 includes the ZCT 117 and the leakage zero phase detector 119, which can detect a leakage of AC power and, if present, control the wiring breakers 111 and the magnetic switch 113 to break AC power supplied to the metal post side, thereby protecting the passersby against electrical shock.

However, even though the power lines supplying AC power from the controlling unit 110 to the metal posts sides 115 are typically buried under the ground to be protected from mechanical damage and to be electrically isolated from other lines or devices, they cannot be substantially electrically isolated from the external environment. Namely, there is a relatively small amount of leakage current through an insulation part of the power lines 115 regardless of inundation thereof. Therefore, if the ZCT 117 and leakage zero phase detector 119 are set to be too sensitive, they can operate the wiring breakers 111 and magnetic switch 113 to break AC power supplied to the lamps of the metal posts with respect to a relatively small leakage current flowing from the isolation part of the power lines 115 to the ground, thereby easily turning off the lamps.

To prevent such problems, the ZCT 117 and leakage zero phase detector 117 are set to operate the wiring breakers 111 and magnetic switch 113 to break AC power only if they detect a predetermined leakage current. Even though they operate based on the settings, since they allow leakage current under the predetermined leakage current, they cannot completely prevent electrical shock of passersby from the leakage current.

To solve the problem, Korean Utility Model Registration No. 255182 (Korean Utility Model Application No. 20-2001-24190) filed by the present applicant discloses an apparatus including inundation sensor rods installed within the metal posts for sensing inundation of the metal posts. Therefore, when the inundation sensor rods sense inundation of the metal posts, transient current is generated and flows through AC power by contacting contact points of the relays. Then, wiring breakers 111 of a controlling unit 110 detect the transient current to break AC power supplied to the metal post side.

However, since the apparatus of Korean Utility Model Registration No. 255182 operates such that contact means, such as a relay, for connecting AC power lines to each other to generate a short current, contact points of the contact means can be easily damaged by the short current. Therefore the conventional apparatus has disadvantages in that the contact means such as a relay, a magnetic switch, and an MCCB (Moulded Case Circuit Breaker) etc. must be frequently replaced with new ones.

SUMMARY OF THE INVENTION

Therefore, the present invention has been made in view of the above problems, and it is an object of the present invention to provide a power breaking apparatus for prevention of electrical shock capable of detecting leakage voltage leaked around a metal post and generating ground current if the detected leakage voltage is over a predetermined limit voltage to break AC power supplied to the metal post, thereby protecting passersby against electrical shock.

It is another object of the present invention to provide a power breaking apparatus for prevention of electrical shock capable of generating ground current to break AC power supplied to a metal post, if the metal post is inundated by water, which may cause electrical shock, thereby protecting passersby against electrical shock.

It is a further object of the present invention to provide a power breaking apparatus for prevention of electrical shock capable of breaking AC power by transient current generated by connecting AC power lines to each other if AC power is not cut by ground current.

It is another object of the present invention to provide a power breaking apparatus for prevention of electrical shock capable of breaking AC power by short current generated by shorting AC power lines to each other if AC power is not cut by transient current.

It is yet another object of the present invention to provide a power breaking apparatus for prevention of electrical shock capable of detecting leakage voltage of AC power supplied to a variety of industrial equipment, electrical devices such as electric outlets in a bathroom, and electrical appliances such as electric washing machines, refrigerators, etc., and breaking AC power if the detected leakage voltage is over a predetermined limit voltage, thereby preventing electrical shock and fire.

In accordance with the present invention, the above and other objects can be accomplished by the provision of a power breaking apparatus for prevention of electrical shock comprises inundation sensor rods for sensing inundation of a metal post, a power break signal generation unit for generating a ground current operation signal if the inundation sensing unit senses inundation of the metal post, and shorting AC power if a predetermined time lapses, a zero phase sequence current transformer (ZCT) for detecting ground and short currents, and wiring breakers and a magnetic switch for breaking AC power based on the ground and short currents of the ZCT. Preferably, it may further comprise a current transformer for detecting transient current when AC power is shorted by the power break signal generation unit, and controlling the wiring breakers and magnetic switch to break AC power.

Preferably, the inundation sensor rods may comprise a reference voltage generation unit for generating positive and negative reference voltages for detecting an inundation voltage, and applying the negative reference voltage to one of the plurality of inundation sensor rods, an inundation discriminator for applying the positive reference voltage to the other inundation sensor rod, and determining inundation of the metal post based on a voltage change between the two inundation sensor rods each of which inputs the positive and negative voltages, and an inundation signal output unit for outputting an inundation signal to operate the power break signal generation unit if the inundation discriminator determines that the inundation the metal post is inundated.

Preferably, the inundation sensor rods may comprise a leakage voltage sensor for sensing a leakage voltage over a predetermined voltage, and the power break signal generation unit generates ground current if the leakage voltage sensor senses the leakage voltage over the predetermined voltage and allows transient current to flow thereto if a predetermined time lapses, thereby breaking AC power supplied through power lines.

Preferably, the inundation sensor rods may comprise a leakage voltage sensor for sensing a leakage voltage over a predetermined voltage, and the power break signal generation unit generates transient current if the leakage voltage sensor senses the leakage voltage over the predetermined voltage and short current if a predetermined time lapses, thereby breaking AC power supplied through power lines.

Preferably, the leakage voltage and inundation sensing unit may include a plurality of leakage voltage detectors for detecting a voltage between both ends of the leakage voltage senor rods, a full wave rectifier for rectifying the detected voltage of the plurality of leakage voltage detectors in a negatively rectified full wave format, a reference voltage generation unit for generating positive and negative reference voltages for detecting inundation and leakage voltages, and applying the negative reference voltage to one of the plurality of inundation sensor rods, an inundation voltage detection unit for applying the positive reference voltage to other inundation sensor rod, and detecting an inundation voltage (of a metal post) based on a voltage change between the two inundation sensor rods each of which inputs the positive and negative voltages, a leakage voltage detection unit for comparing the detected voltage in the negatively rectified full wave format with the positive reference voltage of the reference voltage generation unit, and detecting a leakage voltage over a preset voltage based on a result of the comparing, and a leakage voltage and inundation signal output unit for operating the power break signal generation unit if the leakage voltage over the preset voltage is detected or the inundation voltage is detected.

Preferably, the power break signal generation unit includes an operation signal generation unit for generating a power breaking operation signal according to a control signal of the leakage voltage and inundation sensing unit, a ground current generation unit for generating amplified ground current according as AC power supplies into the ground based on a power break operation signal of the ground current generation unit, and a short current generation unit for allowing transient current to flow thereto and for allowing AC power to be cut, if a the predetermined time set by a timer switch lapses, wherein the timer switch operates when the power break operation signal is generated in the operation signal generation unit.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted when it may make the subject matter of the present invention rather unclear.

Figure 2:
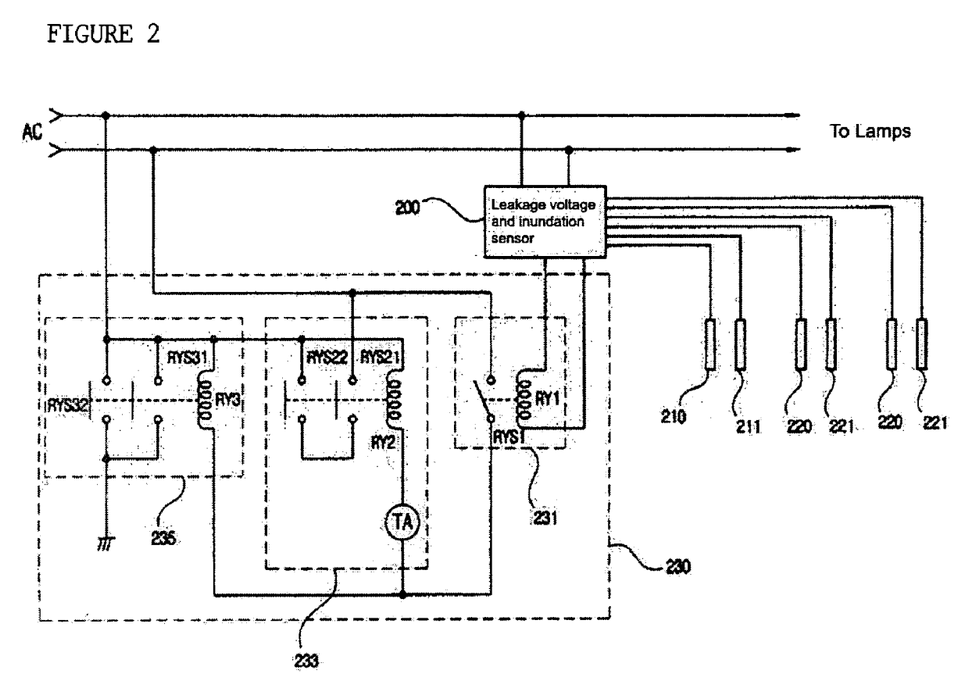
FIG. 2 is a circuit diagram of a power breaking apparatus for prevention of electrical shock according to the present invention.
Figure 3:
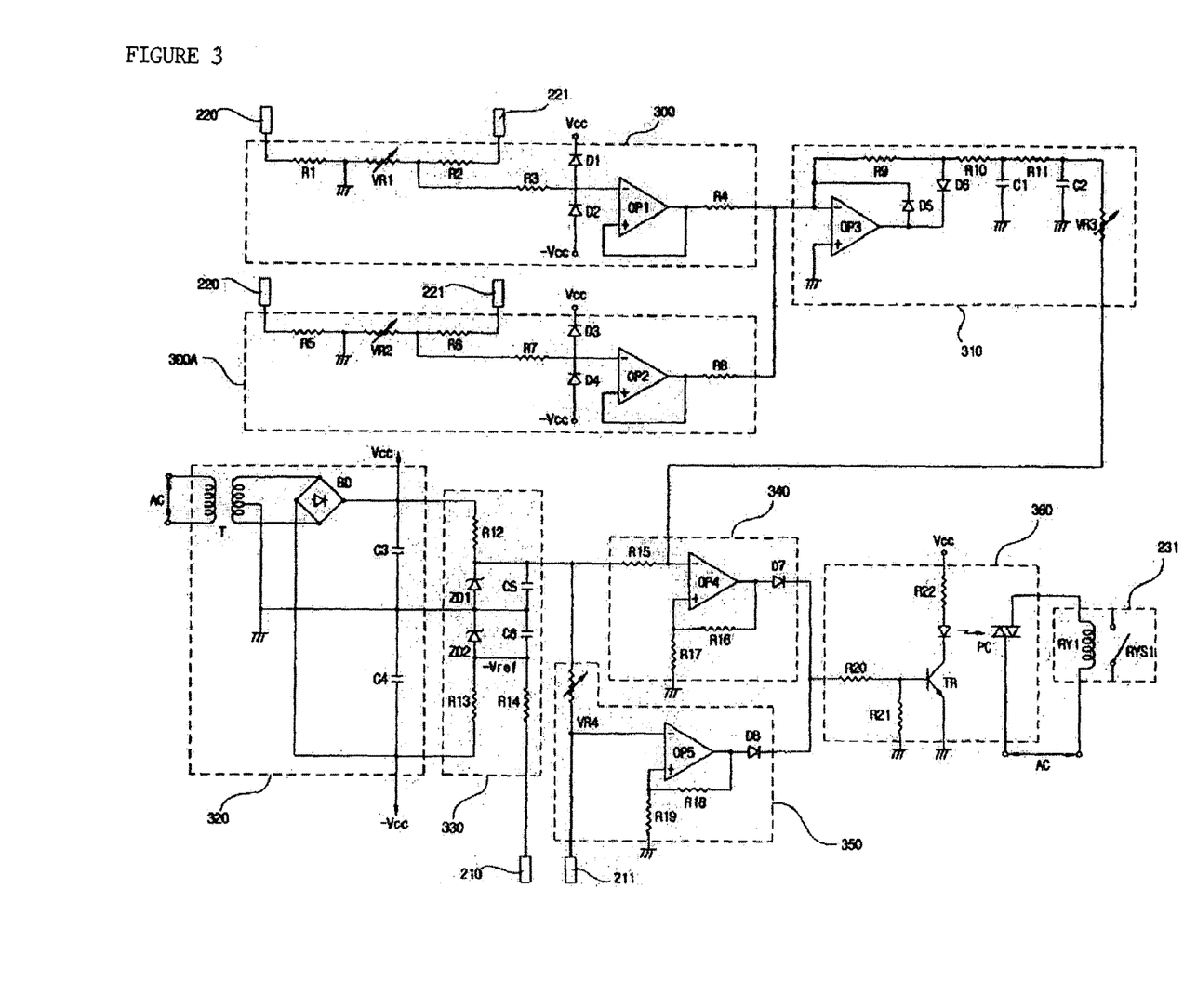
FIG. 3 is a circuit diagram of a leakage voltage and inundation sensing unit of FIG. 2.

With reference to FIGS. 2 and 3, a power break apparatus for prevention of electrical shock according to the present invention will be described. Here, in the drawings, the same or similar elements are denoted by the same reference numerals even though they are depicted in different drawings.

FIG. 2 is a circuit diagram of a power breaking apparatus for prevention of electrical shock according to the present invention.

As shown in the drawing, the power breaking apparatus according to the present invention comprises a leakage voltage and inundation sensing unit 200 for sensing inundation of a metal post 100 based on an operation of inundation sensor rods 210 and a leakage voltage over a predetermined voltage based on operations of a plurality of leakage voltage sensor rods 220 and 221, and a power break signal generation unit 230 for generating ground current if the leakage voltage and inundation sensing unit 200 senses inundation of the metal post or leakage voltage over the predetermined voltage and shorting AC power if a predetermined time lapses such that wiring breakers 111 and a magnetic switch 113 can break AC power supplied to the metal post side.

The power break signal generation unit 230 includes an operation signal generation unit 231 for generating a power break operation signal according as a relay RY1 operates based on a control signal of the leakage voltage and inundation sensing unit 200 such that a switch RYS1 of the relay RY1 performs a contact operation, a short current generation unit 233 for shorting AC power according as a relay RY2 operates such that switches RYS21 and RYS22 of the relay RY2 perform contact operations if a predetermined time set by a timer switch TA operated according to the power break operation signal lapses, and a ground current generation unit 235 for generating ground current according as a relay RY3 operates such that switches RYS31 and RYS32 of the relay RY3 perform contact operations to flow AC power to the ground based on the power break operation signal of the operation signal generation unit 231.

The inundation sensor rods 210 and 211 to sense inundation are installed at a predetermined height from the ground within the metal post 100 and electrically connected to each other by water when they are inundated. The leakage voltage sensor rods 220 and 221 are installed at a position, such as on a metal post, under the ground or at a ground location apart from the metal post by a predetermined distance, thereby sensing leakage voltage leaked from the metal post 100.

The power break apparatus for prevention of electrical shock according to the present invention is operated in the following manner: The leakage voltage and inundation sensing unit 200 receives AC power flowing in power lines from a controlling unit 110 to lamps of the metal posts. The leakage voltage and inundation sensing unit 200 senses inundation according as the inundation sensor rods 210 and 211 are electrically contacted to each other or leakage voltage over a predetermined leakage voltage according as the leakage voltage sensor rods 220 and 221 sense the leakage voltage. If the inundation sensor rods 210 and 211 are electrically contacted to each other or the leakage voltage sensor rods 220 and 221 sense the leakage voltage over a predetermined leakage voltage, the leakage voltage and inundation sensing unit 200 generates a power break control signal and output it to the operation signal generation unit 231 of the power break signal generation unit 230. The power break control signal operates the switch RYS1 of the relay RY1 such that the timer switch TA of the short current generation unit 233 can operate and simultaneously the relay RY3 of the ground current generation unit 235 can operate. The timer switch TA operates such that it counts a predetermined time. The relay RY3 operates such that its switches RYS31 and RYS32 contact each other, thereby producing ground current flowing from AC power to the ground. Therefore, when there is inundation or leakage of AC power, the power break signal generation unit 230 generates ground current according as the switches RYS31 and RYS32 of the relay RY3 are contacted, which is detected by the ZCT 117 and the leakage zero phase detector 119. The ZCT 117 and the leakage zero phase detector 119 operate the wiring breakers 111 and the magnetic switch 113 to break AC power based on the detection of ground current, thereby protecting passersby from electrical shock.

Meanwhile, even if ground current is generated by operations of the switches RYS31 and RYS32 of the relay RY3, if the ground current is not detected by the ZCT 117 and the leakage zero phase detector 119, AC power is not cut by the wiring breakers 111 and the magnetic switch 113. In this case, after counting a predetermined time, the timer switch TA operates switches RYS21 and RYS22 of the relay RY2 in the short current generation unit 233.

When the switches RYS21 and RYS22 of the relay RY2 operate, AC power is shorted therethrough, which produces short current. When short current is present, the wiring breaker 111 can immediately detect it to cut AC power, thereby protecting passersby from electrical shock.

FIG. 3 is a circuit diagram of the leakage voltage and inundation sensing unit 200 of FIG. 2, which comprises the following. A leakage voltage detection units 300 and 300A, each of which detects a voltage between both ends of a plurality of leakage voltage sensor rods 220 and 221, includes resistors R1~R4 and R5~R8, variable resistors VR1 and VR2, diodes D1~D2 and D3~D4, and operation amplifiers OP1 and OP2, respectively. A full wave rectifying unit 310 rectifies the detected voltages of the leakage voltage detection units 300 and 300A in a negatively rectified full wave format, and includes resistors R9~R11, an operational amplifier OP3, diodes D5 and D6, capacitors C1 and C2, and a variable resistor VR3. An operation power generation unit 320 rectifies and smoothes AC power to generate DC operation powers VCC and −VCC. A reference voltage generation unit 330 generates a reference voltage VREF to detect inundation and leakage voltage based on DC operation powers VCC and −VCC and includes capacitors C5 and C6. A leakage voltage determiner compares the reference voltage VREF of the reference voltage generation unit 330 with an output voltage of the full wave rectifying unit 310, determines whether leakage voltage occurs based on a result of the comparison, and includes resistors R15~R17, an operational amplifier OP4 and a diode D7. An inundation determiner 350 applies the reference voltage VREF to the inundation sensor rod 211, determines inundation based on a voltage change of the inundation sensor rods 210 and 211, and includes a variable resistor VR4, resistors R18 and R19, an operational amplifier OP5, and a diode D8. A leakage voltage and inundation signal output unit 360 operates the power break signal generation unit 230 if the leakage voltage determiner 350 detects leakage voltage over the predetermined voltage or the inundation determiner 350 determines inundation, and includes resistors R20~R22, a transistor TR and a coupler PC.

The leakage voltage and inundation sensing unit 200 as configured above will be described in detail based on the respective elements. In the operation power generation unit 320, AC power flowing in the power lines 115 from the controlling unit 110 to the metal post 100 is inputted to a primary coil of a transformer T and outputted voltage dropped AC power at a secondary coil lead thereof. The voltage dropped AC power is rectified by a bridge diode BD and then smoothed by the capacitors C3 and C4 to produce the operation powers VCC and −VCC which are supplied to corresponding elements in the operation power generation unit 320.

In the reference voltage generation unit 330, the operation powers VCC and −VCC are inputted to constant voltage diodes ZD1 and ZD2 via the resistors R12 and R13 to output reference voltages VREF and −VREF therefrom. The reference voltages VREF and −VREF are applied to the inundation sensor rod 210 via the resistor R14.

Also, the reference voltage VREF is inputted to an inverting lead of the operational amplifier OP5 via a variable resistor VR4 in the inundation determiner 350 and an inundation sensor rod 210.

When the metal post 100 is not inundated by water, the inundation sensor rods 210 and 211 are in an open state. Also, since the reference voltage VREF is applied to the inverting lead of the operational amplifier OP5 via the variable resistor VR4, the operational amplifier OP5 outputs a low level output voltage. Therefore, a transistor TR of the leakage voltage and inundation signal output unit 360 inputting the low level output voltage from the operational amplifier OP5 through its base lead does not operate. Since the transistor TR does not operate, the photo coupler PC does not operate, either. Therefore, the relay RY1 of the operation signal generation unit 231 in the power break signal generation unit 230 is not operated.

Meanwhile, when the metal post 100 is inundated by water, the inundation sensor rods 210 and 211 are electrically connected to each other via water. Therefore, the reference voltages VREF and −VREF are divided by the resistor R14 and the variable resistor VR4 and inputted by a result of the dividing to the inverting lead of the operational amplifier OP5.

Also, in the case that the metal post 100 is inundated by water, if the variable resistor VR4 is set to a resistance such that a voltage inputted to the inverting lead of the operational amplifier OP5 is negative, the operational amplifier OP5 outputs a relatively high level output voltage. Then, the transistor TR of the leakage voltage and inundation signal output unit 360 inputting the relatively high level output voltage through its base lead operates such that the photo coupler PC operates. When the photo coupler PC operates, its light emission unit emits lights to its light reception unit, such that AC power flows to the relay RY1 of the operation signal generation unit 231 through the light reception unit. When flowing AC power into the relay RY1, its switch RYS1 performs a contact operation such that the short current generation unit 233 and the ground current generation unit 235 are operated to cut AC power supplied to the metal side.

Meanwhile, in one leakage voltage detection unit 300, detected leakage voltage is divided by the resistors R1 and R2 and the variable resistor VR1, and limited to a level between DC operation powers VCC and −VCC by the diodes D1 and D2. The level limited voltage is inputted to an inverting lead of the operational amplifier OP1 to amplify it. After that the amplified voltage from the amplifier OP1 is inputted to an inverting lead of the operational amplifier OP3 in the full wave rectifying unit 310 via the resistor R4. Similarly, in the other leakage voltage detection unit 300A, detected leakage voltage is divided by the resistors R5 and R6 and the variable resistor VR2, and limited to a level between DC operation powers VCC and −VCC by the diodes D3 and D4. The level limited voltage is inputted to an inverting lead of the operational amplifier OP2 to amplify it. After that the amplified voltage from the amplifier OP2 is inputted to an inverting lead of the operational amplifier OP3 in the full wave rectifying unit 310 via the resistor R8.

The full wave rectifying unit 310 rectifies the amplified voltages from the amplifiers OP1 and OP2 in a negative full wave format and outputs a rectified voltage in the negatively full wave format to an inverting lead of the operational amplifier OP4 of the leak voltage determiner 340.

In the case that the leakage voltage sensor rods 220 and 221 detect leakage voltage under a predetermined voltage, if a variable resistor VR3 of the full wave rectifying unit 310 is set such that the rectified voltage in the negatively full wave format from the full wave rectifying unit 310 is set to output less than the reference voltage VREF, the operational amplifier OP4 of the leakage voltage determiner 340 inputs positive voltage via its inverting lead and outputs a relatively low level output voltage via its output lead.

Since the transistor TR of the leakage voltage and inundation signal output unit 360 inputs the relatively low level output voltage via its base, it is not operated, which causes the photo coupler to be disabled. Therefore, since the photo coupler PC does not operate, the relay RY1 of the operation signal generation unit 231 is not operated, either.

Meanwhile, if the leakage voltage sensor rods 220 and 221 detect leakage voltage over a predetermined voltage, since a rectified voltage of the full wave rectifying unit 310 is higher than the reference voltage VREF, the operational amplifier. OP4 of the leakage voltage determiner 340 inputs negative voltage via its inverting lead. Therefore, the operational amplifier OP4 outputs a relatively high level output voltage via its output lead.

Since the transistor TR of the leakage voltage and inundation signal output unit 360 inputs the relatively high level output voltage via its base, it is operated, which causes the photo coupler to be active. When the photo coupler PC operates, its light emission unit emits lights to its light reception unit, such that AC power flows to the relay RY1 of the operation signal generation unit 231 through the light reception unit. When flowing AC power into the relay RY1, its switch RYS1 performs a contact operation such that the short current generation unit 233 and the ground current generation unit 235 are operated to cut AC power supplied to the metal side.

One of the pluralities of leakage voltage sensor rods is installed such that one line from the leakage voltage sensor rods is connected to N phase and the other line from the leakage voltage sensor rods is connected to metal posts.

Figure 4:
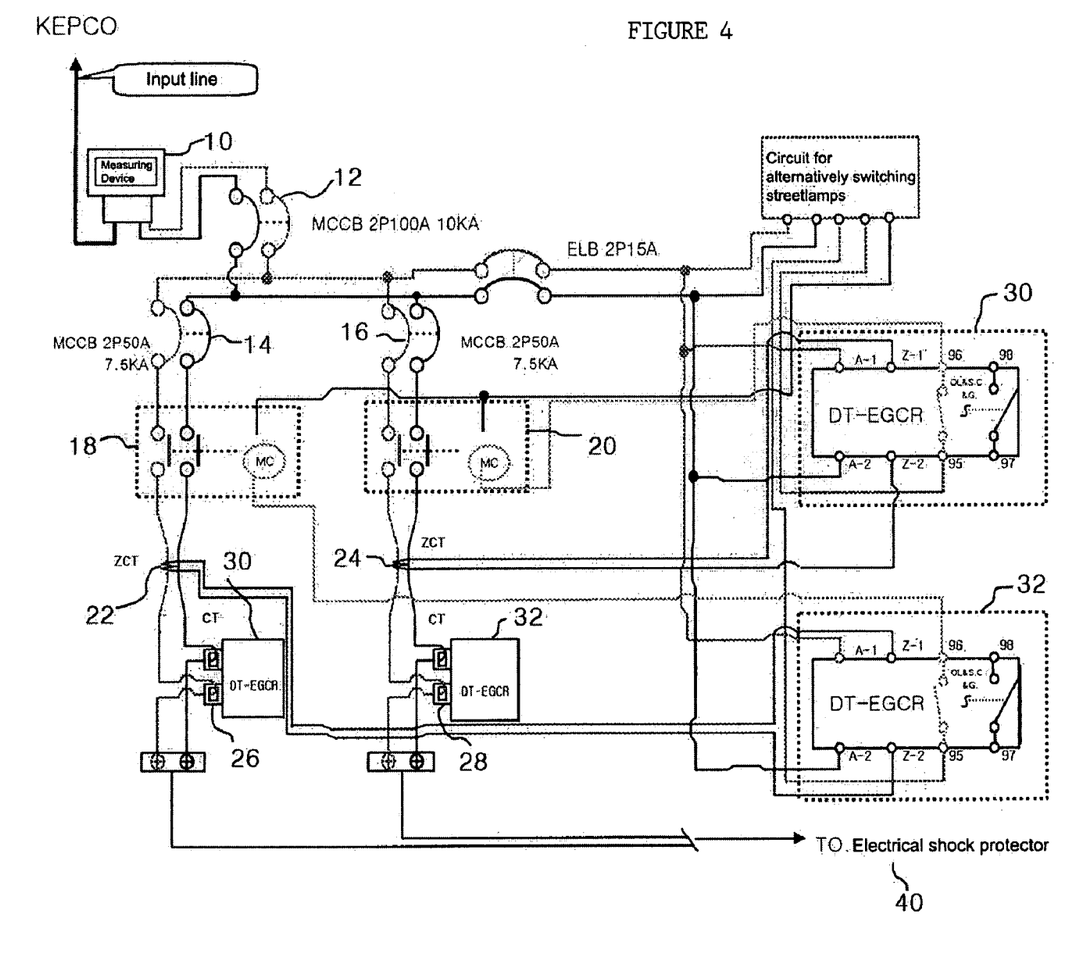
FIG. 4 is a schematic circuit diagram of the power breaking apparatus for prevention of electrical shock according to another embodiment of the present invention.

FIG. 4 is a schematic circuit diagram of the power breaking apparatus for prevention of electrical shock according to another embodiment of the present invention, which comprises the following.

A main circuit breaker 12 detects current states of AC power inputted in a measuring device 10 from the outside, and breaks AC power when transient current or leakage current flows in power lines. A plurality of sub circuit breakers 14 and 16 are connected by cables to out leads of the main circuit breaker 12, in which each of the plurality of sub circuit breakers 14 and 16 provides AC power input via the cables to respective electrical loads, and breaks AC power when there is transient current or leakage current in the respective electrical loads. A plurality of zero phase current transformers (ZCTs) 22 and 24 detect transient current or leakage current in the respective electrical loads. A plurality of current transformers (CTs) 26 and 28 detect transient current or short current in the respective electrical loads. A plurality of magnetic switches 18 and 20 break AC power when leakage and transient current or short current are detected by the plurality of ZCTs 22 and 24 or a plurality of relays 30 and 32. An electrical shock protector 40 inputs AC power via each of the plurality of relays 30 and 32 and generates ground current if inundation occurs or leakage voltage is detected over the preset voltage.

An MCCB (Moulded Case Circuit Breaker) or ELCB (Earth Leakage Circuit Breaker) installed in the controlling unit 110 according to the present invention is utilized as an AC power circuit breaker for protecting AC power loads of buildings such as apartments, complex buildings for office and house, or power lines. The respective MCCB and ELCB are manufactured for a single phase of 220V or three phases of 380V. The breaker structure for a single phase of 220V has respective two input leads and two output leads. Also, the breaker structure for three phases of 380V has three input or output leads (R, S, T), or four input or four output leads (R, S, T, N), in which N denotes a neutral phase.

A conventional MCCB has been used for protecting loads from transient current caused by overload, and a conventional ELCB has been utilized for protection of load from leakage and transient current caused by overload.

The MCCB performs an OFF switching operation to cut AC power such that a bimetal circuit therein is operated when transient current flows in a circuit due to overloads. Meanwhile, retrieval of an ON switching state from the OFF switching state is achieved by manually operating a manual switch. Also, the ELB includes the above functions of the MCCB and additionally a circuit for performing a switching operation based on detection of a current difference between input and output currents using a ZCT when there is a leak and leakage current.

Figure 5:
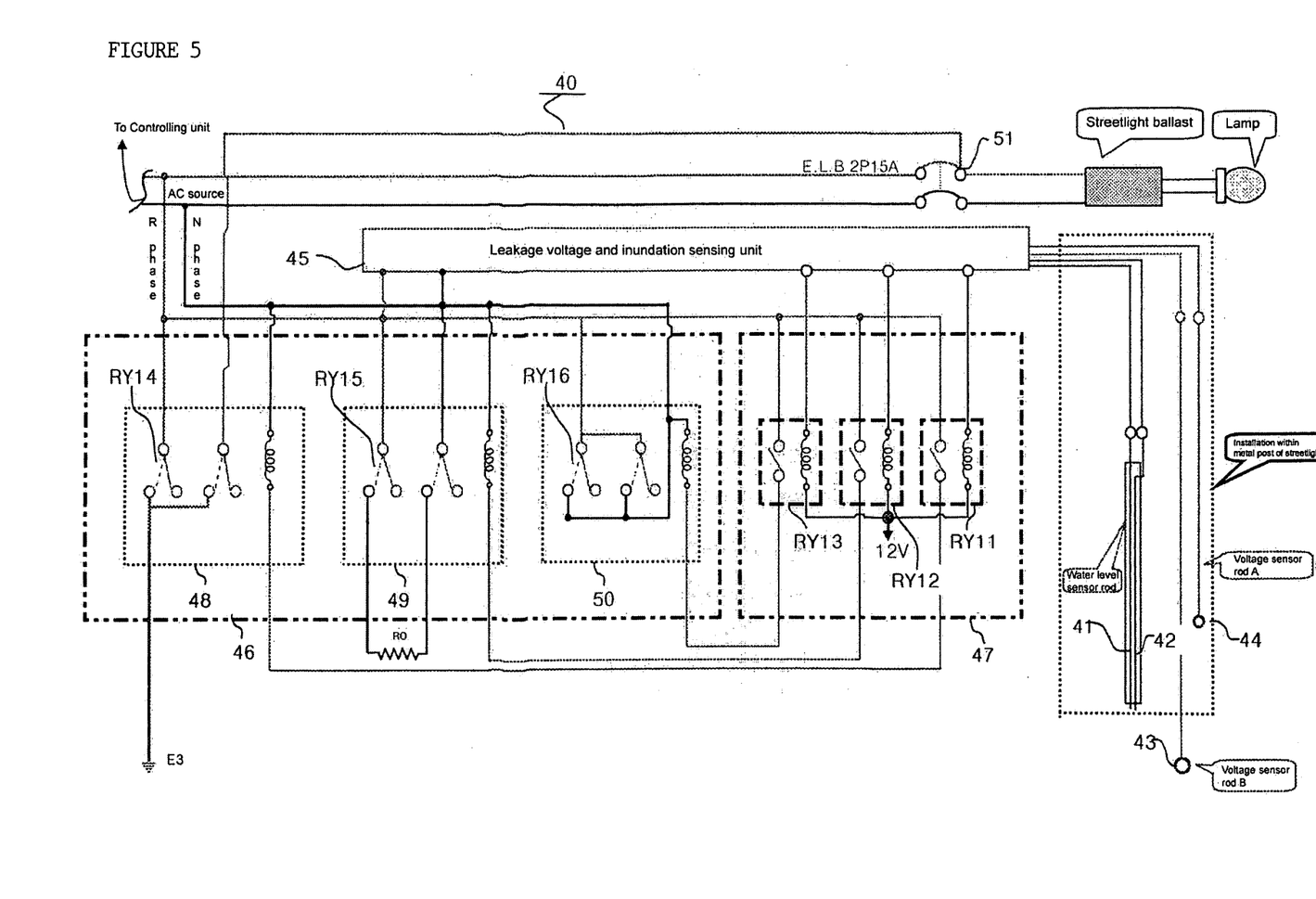
FIG. 5 is a detailed circuit diagram of the electrical shock protector 40 of FIG. 5.

FIG. 5 is a detailed circuit diagram of the electrical shock protector 40 of FIG. 5, which comprises the following.

Inundation sensor rods 41 and 42 are installed on a metal post 100 and located about a predetermined height, for example, 50 mm, off the ground to detect an inundation state. A plurality of leakage sensor rods 43 and 44 are installed such that one is buried under the ground and another is connected to the metal post. A leakage voltage and inundation sensing unit 45 detects inundation states based on a result of the plurality of inundation sensor rods 41 and 42 and leakage voltage over a predetermined voltage based on the leakage sensor rods 43 and 44. A power break signal generation unit 46 performs control operations to generate ground current, transient current and short current, in order, when the leakage voltage and inundation senor 45 detects the leakage voltage and the inundation state.

The power break signal generation unit 46 includes the following: An operation signal generation unit 47 generates a power break operation signal while relays RY11, RY12 and RY13 therein are driven, in order, based on a control signal of the leakage voltage and inundation senor 45. A transient current generation unit 49 performs an operation to generate transient current of AC power while a relay RY15 is driven after a predetermined time lapses, if the power break operation signal is generated from the operation signal generation unit 47. A short current generation unit 50 performs an operation to generate short current of AC power when the power break operation signal is generated from the operation signal generation unit 47 if a predetermined time lapses after the transient current occurs while a relay RY16 is driven. A ground current generation unit 48 amplifies and generates ground current such that AC power inputted to one input lead of a relay RY14 flows to the ground according as the relay RY14 operates when the operation signal generation unit 46 generates the power break operation signal.

The relay RY15 of the transient current generation unit 50 is connected to R and N phase AC power lines via its contact points and connected to a core resistor R0 via its other contact points. Therefore, when the relay RY15 performs a connection operation of the R phase AC power line and the N phase AC power line via the core resistor R0, a transient current is generated in AC power such that contact points of the magnetic switches 18 and 20, the main circuit breaker 12 and the sub circuit breaker 14 and 16 etc, can be protected and coil loss of transformers installed on the posts for supporting power transmission lines can be prevented. Also, the relay RY16 of the short current generation unit 50 is connected at one contact point to an R phase AC power line and at another contact point to an N phase AC power line. Therefore, when the relay RY16 connects the R and N phase AC power lines to each other, short current is generated to break AC power such that all of the contact points of the magnetic switches 18 and 20, main circuit breakers 12 and sub circuit breakers 14 and 16 are opened.

If the inundation sensor rods 41 and 42 installed within the metal post and located off the ground are inundated, they are electrically connected to each other via water. The leakage voltage sensor rods 43 and 44 are installed at a predetermined location, such as on a metal post, under the ground or at a ground location apart form the metal post with a predetermined distance, thereby sensing leakage voltage leaked from the metal post 100.

The power break apparatus for prevention of electrical shock as configured above is operated in the following manner: First of all, AC power is supplied to the leakage voltage and inundation sensing unit 45 via the relays 30 and 32. The leakage voltage and inundation sensing unit 45 determines whether the inundation sensor rods 41 and 42 are inundated and electrically connected to each other or whether the leakage voltage sensor rods 43 and 44 detect leakage voltage over a predetermined voltage. If the inundation sensor rods 41 and 42 are inundated and electrically connected to each other or the leakage voltage sensor rods 43 and 44 detect leakage voltage over a predetermined voltage, a power break signal is applied to the operation signal generation unit 47 of the power break signal generation unit 46. Therefore, the relays RY14, RY15 and RY16 are selected, in order, with a predetermined interval. First of all, when the relay RY11 is an ON state, current flows in coils of the relay RY14 to select one of operations, in which the R phase AC power line is grounded, thereby being amplified ground current. If a time, for example, 0.05 s, lapses after the ground current is generated by the relay RY14, the relay RY12 performs an ON switching operation. When the relay RY12 is in an ON state, current flows in coils of the relay RY15 to select one of operations, in which transient current is generated via the core resistor R0.

Also, if a time, for example, 0.05 s, lapses after the transient current is generated by the relay RY15, the relay RY13 performs an ON switching operation. When the relay RY13 is in an ON state, current flows in coils of the relay RY16 to select one of operations, in which AC power line is shorted, thereby amplifying short current. Therefore, ground current, transient current and short current detected by the zero phase sequence current transformers (ZCTs) 22 and 24, the current transformers (CTs) 26 and 28, and the relays 30 and 32, which are connected to AC power lines, deactivate the magnetic switches 18 and 20, the main circuit breaker 12 and the sub circuit breakers 14 and 16, thereby breaking AC power. Therefore, electrical shock from leak of AC power can be prevented.

Meanwhile, even if ground current is generated by operation of the switches of the relay RY14, if the ground current is not detected by the ZCTs 22 and 24, and the relays 30 and 32, AC power is not cut by the main circuit breaker 12, the subcircuit breakers 14 and 16 and the magnetic switches 18 and 20. In this case, after a predetermined time lapses, the relay RY12 performs a switching ON operation to enable the relay RY15 to change the switching state of the relay RY15.

Then, AC power through the switches of the RY15 and the core resistor R0 includes transient current. Therefore, the CTs 26 and 28 and the relays 30 and 32 detect the transient current such that AC power is cut, thereby preventing electrical shock from leak of AC power.

Meanwhile, even if transient current is generated by operations of the switches of the relay RY15, if the transient current is not detected by the CTs 26 and 28 and the relays 30 and 32, AC power is cut by the main circuit breaker 12, the sub-circuit breakers 14 and 16 and the magnetic switches 18 and 20. In this case, after a predetermined time lapses, the relay RY13 performs a switch ON operation to enable the relay RY16 to change the switching state of the relay RY16.

Then, AC power through the switches of the relay RY16 is shorted to the ground to produce short current. Therefore, the ZCTs 22 and 24, the CTs 26 and 28, and the relays 30 and 32 detect the short current such that AC power is cut, thereby preventing electrical shock from leak of AC power.

Also, since the ELCB 51 breaks AC power supplied to streetlamps of the metal posts 100 that are inundated or produce leakage voltage, it can enable passersby and workers to recognize which metal posts are in a normal operation state and which are in abnormal operation states caused by inundation of the metal post or leakage voltage leaked from the metal post. Also, the ELCB 51 cuts AC power supplied to the streetlamps of the metal post due to leakage current of the streetlamp ballast. Also, the ELCB 51 performs a forcible cutting operation using a ground current generation unit 48. Therefore, when the streetlamps do not illuminate the street, workers can easily check the reasons of the abnormal operation streetlamps, such as a leakage voltage, and restore them. When restoring the streetlamps in abnormal operation states to resupply AC power thereto, since AC power can be normally supplied to the streetlamps in the normal operation state except for the streetlamps to be restored, the present invention can resolve the conventional problems that AC power cannot be supplied to the normally operating streetlamps while the streetlamps in the abnormal operation state are restored.

Figure 6:
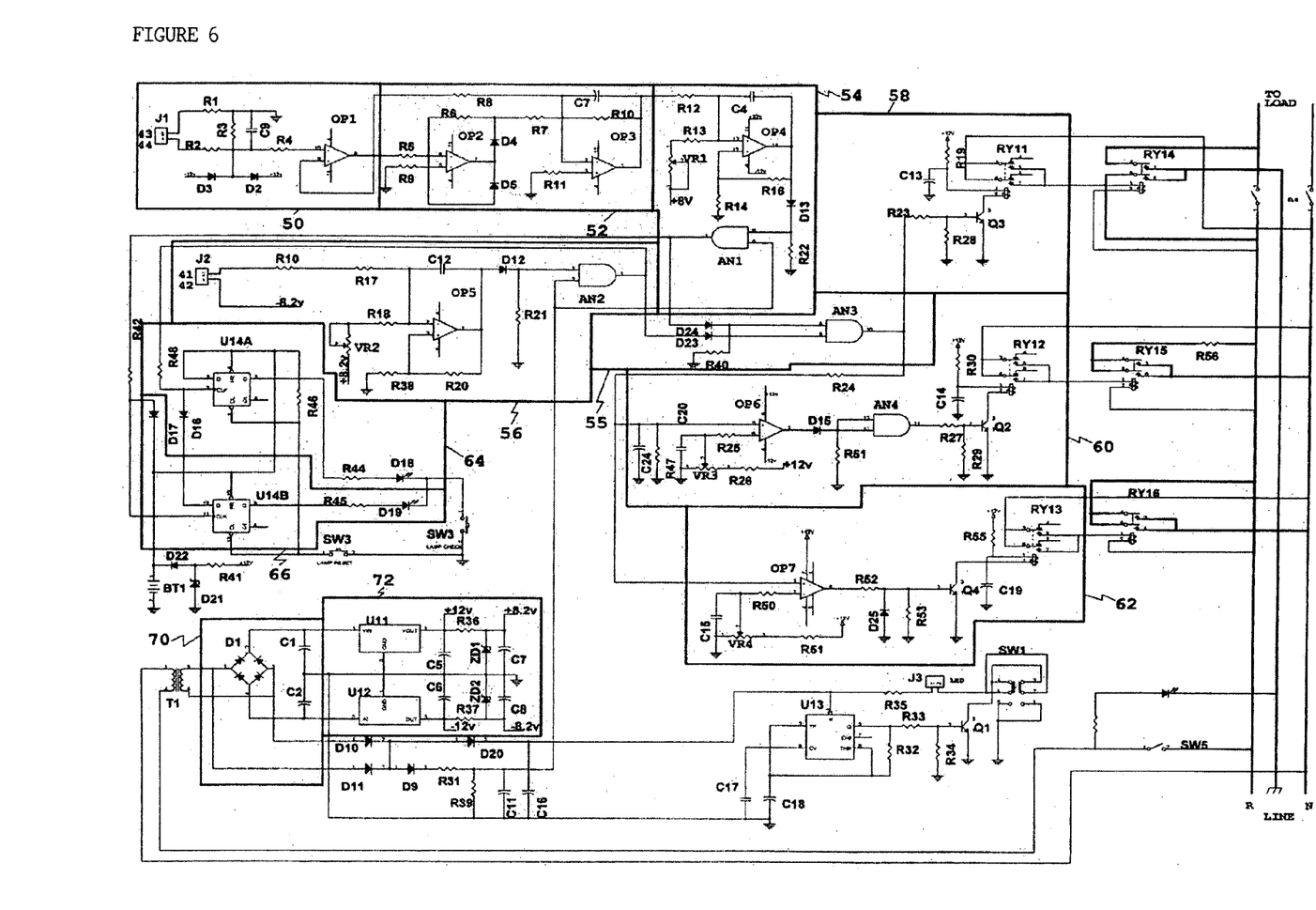
FIG. 6 is a detailed circuit diagram of a leakage voltage and inundation sensing unit 45 of FIG. 5.

FIG. 6 is a detailed circuit diagram of a leakage voltage and inundation sensing unit 45 of FIG. 5, which comprises the following.

A leakage voltage detection unit 50 detects a voltage between both ends of the leakage voltage sensor rods 43 and 44 as shown in FIG. 5 and includes resistors R1~R4, a capacitor C9, diodes D2 and D3, and an operational amplifier OP1. A full wave rectifying unit 52 rectifies the detected voltage of the leakage voltage detection unit 50 to a negative full wave format and includes resistors R5~R9 and R11, amplifiers OP2 and OP3, diodes D4 and D5, and capacitors C1 and C2. A leakage voltage discrimination unit 54 compares the negatively rectified full wave voltage of the full wave rectifying unit 52 with a reference voltage from a reference voltage generation unit 72, determines a leakage voltage state based on a result of the comparison, and includes resistors R12~R16, R22, a variable VR1, a diode D13, an AND gate AN1, and an operational amplifier OP4. An inundation voltage sensing unit 56 detects a voltage between both ends of the inundation sensor rods 41 and 42 as shown in FIG. 5, and includes resistors R10 and R17~R21, an amplifier OP5, a diode D12, and an AND gate AN2. A signal selection unit 55 includes diodes D23 and D24 each of which inputs a leakage voltage determination signal of the leakage voltage discrimination unit 54 and an inundation voltage sensing signal of the inundation voltage sensor unit 56 via each cathode lead and outputs it via each anode lead shorted to the ground, and an AND gate AN3 inputting the leakage voltage determination signal and the inundation voltage sensing signal, which are outputted from the respective diodes D23 and D24 and shorted to the ground, via its input leads to selectively out its output. A first leakage voltage and inundation signal output unit 58 outputs a ground current signal generation control signals based on one of the leakage voltage determination signal and inundation voltage sensing signal from the signal selection unit 55, and includes resistors R20~R23 and a transistor Q3. A second leakage voltage and inundation signal output unit 60 inputs the leakage voltage determination signal and inundation voltage sensing signal from the signal selection unit 55, outputs a short current signal generation control signal if a predetermined time, for example, 0.5 s, lapses, and includes resistors R24~R29, capacitors C20 and C24, and a transistor Q2. A third leakage voltage and inundation signal output unit 62 inputs the leakage voltage determination signal and inundation voltage sensing signal from the signal selection unit 55, outputs a short current signal generation control signal if a predetermined time, for example, 0.5 s, lapses, and includes resistor R50~R53, capacitors C15 and C19, a variable resistor VR4, a diode D25, an operational amplifier OP7, and a transistor Q4. An operation power generation unit 70 rectifies and smoothes AC power to generate DC operation power VCC and −VCC, and includes a diode D1 and capacitors C1 and C2. A reference voltage generation unit 72 generates reference voltages VREF and −VREF, which are used for detecting inundation and leakage voltage based on the DC operation powers VCC and −VCC, outputted to the inundation sensor rod 42 as shown in FIG. 5, and includes regulators U11 and U12, resistors R37 and R38, Zener diodes ZD1~ZD2 and capacitors C5~C8. The switch SW3 is operated to indicate a leakage state or inundation state. A leakage operation state display unit 66 inputs the leakage voltage determination signal from the leakage voltage discrimination unit 54, based on a reset operation, or according as one of the switch SW3 performs an ON operation, and outputs a leakage state display control signal. An inundation operation state display unit 64 inputs the inundation voltage sensing signal from the inundation voltage sensing unit 56, based on a reset operation, or according as the other switch SW3 performs an ON operation, and outputs an inundation state display control signal. A first LED D19 displays a leakage state based on the leakage state display control signal. A second LED D18 displays an inundation state based on the inundation state display control signal.

Here, the leakage voltage detection unit 50, the full wave rectifying unit 52 and the leakage voltage discrimination unit 54 are comprised in a leakage voltage sensor. The leakage voltage sensor senses leakage voltage over a preset voltage through the leakage voltage sensor rods 43 and 44.

The leakage voltage and inundation sensing unit 45 is operated the following manner: A transformer T1 of the operation power generation unit 70 converts AC power inputted in primary coils to voltage dropped AC power in secondary coils, and outputs it. The voltage dropped AC power is rectified by a bridge diode D1 and then smoothed by capacitors C1 and C2. The smoothed DC power is converted into operation powers VCC and −VCC by regulators U11 and U12 of an operation power generation unit 70.

The operation powers VCC and −VCC are further smoothed by the capacitors C5 and C6 and then applied to constant voltage diodes ZD1 and ZD2 to produce reference voltages VREF and −VREF through resistors R37 and R38. The negative reference voltage −VREF is applied to the inundation sensor rod 42. The positive reference VREF is applied to an operational amplifier OP5 via its inverting lead through the variable resistor VR2 of the inundation voltage sensing unit 56.

If the metal post 100 is not inundated by water, the inundation sensor rods 41 and 42 are maintained in an open state. Since the reference voltage VREF is applied to the operational amplifier OP5 through its inverting lead via variable resistor VR2, the operational amplifier OP5 outputs a low level output voltage. The AND gate AN2 inputs the low level output voltage of the operational amplifier OP5 via a diode D12 and a high level output voltage from the operation power generation unit 70, and outputs a low logic signal. The AND gate AN3 of the signal selection unit 55 inputs the low logic signal through one input lead, which is outputted from the AND gate AN2, via the diode D23, and a logic signal through the other input lead, via the diode D24, thereby outputting a low logic signal. Here, the output signals from the respective diodes D23 and D24 are shorted to the ground before being inputted to the AND gate AN3. The low logic signal of the AND gate AN3 is applied to a base lead of the transistor Q3 through a resistor R23 in the first leak voltage and inundation signal output unit 58. Also, the low logic signal of the AND gate AN3 is applied to a base lead of the transistor Q2 through a resistor R24, an operational amplifier OP6, a diode D14, an AND gate AN4, and a resistor R27 in the second leakage voltage and inundation signal unit 60. Also, the low logic signal of the AND gate AN3 is applied to a non-inverting lead of an operational amplifier OP7 through a resistor R24, and then an output of the operational amplifier OP7 is inputted to a base of the transistor Q4 through a resistor R52 in the third leakage voltage and inundation signal output unit 62. Due to the above connection of the electrical elements, the transistors Q2, Q3, and Q4 are all in an active state. Therefore, the relays RY11, RY12, and RY13 of the operation signal generation unit 47 are not driven.

Meanwhile, if the metal post 100 is inundated by water, the inundation sensor rods 41 and 42 are electrically connected to each other via water, therefore the reference voltage VREF is applied to the operational amplifier OP5 through its inverting lead through a variable resistor VR2 and a resistor R18. Here, the variable resistor VR2 is set to a predetermined resistance value such that the operation amplifier OP5 inputs negative voltage and outputs a high level output voltage. The AND gate AN2 inputs the high level output voltage of the operational amplifier OP5 through its one input lead via a diode D12, and a high level output voltage from the operation power generation unit 70 through the other input lead, thereby outputting a high logic signal. The AND gate AN3 of the signal selection unit 55 inputs the high logic signal through one input lead, which is outputted from the AND gate AN2, through the diode D23, and a logic signal through the other input lead, via the diode D24, thereby outputting a high logic signal. Here, the output signals from the respective diodes D23 and D24 are shorted to the ground before being inputted to the AND gate AN3. The high logic signal of the AND gate AN3 is divided by resistors R23 and R28 to input a base lead of the transistor Q3 in the first leak voltage and inundation signal output unit 58. Then, the transistor Q3 is activated such that current flows in coils of the relay RY11 connected to its collector lead, thereby the switch of the relay RY11 is in an ON state. When the switch of the relay RY11 is in the ON state, current flows in coils of the relay RY14 such that the switch of the relay RY14 is operated to flow AC power to the ground, thereby generating ground current in AC power. Then, the ZCTs 22 and 24, CTs 26 and 28, and relays 30 and 32 detect the ground current to operate the magnetic switches 18 and 20, the main circuit breaker 12 and the sub-circuit breakers 14 and 16 such that AC power is cut.

The high logic signal of the AND gate AN3 is charged in a capacitor C24 via a resistor R24. Here, the resistance value of the resistor R24 and the capacitance value of the capacitor C24 are set such that RC time constant is 0.13 s. After 0.13 s lapses, the operational amplifier OP6 inputs the charge, or the high level signal, through the non-inverting lead, amplifies it based on an amplification ratio adjusted by a variable resistor VR3 and outputs a high level signal through its output lead to an AND gate AN4 via a diode D15. The high level signal through the AND gate AN4 is divided by resistors R27 and R28 to then input a base lead of the transistor Q2. Then, the transistor Q3 is activated such that current flows in coils of the relay RY12 connected to its collector lead, thereby the switch of the relay RY12 is in an On state. When the switch of the relay RY12 is in the ON state, current flows in coils of the relay RY15 such that the relay RY15 performs a switching operation to connect an R phase AC power line to an N phase AC power line through a core resistor R0, thereby producing transient current in AC power. Then, the CTs 26 and 28, and relays 30 and 32 detect the transient current to operate the magnetic switches 18 and 20, the main circuit breaker 12 and the sub-circuit breakers 14 and 16 such that AC power is cut.

Even if ground current or transient current is detected, in order to prevent a case where AC power is not cut by the magnetic switches 18 and 20, the main circuit breaker 12 and the sub-circuit breakers 14 and 16, the resistance value of the variable resistor VR4 is set to be larger than that of the variable resistor VR3. Then, the operational amplifier OP7 inputs the high level signal from the AND gate AN3 through its non-inverting lead through the resistor R24 and the capacitor C24, and outputs a low level signal before the high level signal from the AND gate AN3 is higher than a setting value previously set by the variable resistor VR4. If the high level signal HIGH from the AND gate AN3 is higher than a setting value previously set by the variable resistor VR4, the operational amplifier OP7 outputs a high level signal. If the variable resistor VR3 is set to a voltage, for example, 3V, inputted to the inverting lead of the operational amplifier OP6, the variable resistor VR4 preferably is set to a voltage, for example, 6V, inputted to the inverting lead of the operational amplifier OP7. Then, if 0.5 s lapses after the transistor Q2 is active, the transistor Q4 is active, too. The high level signal of the operational amplifier OP7 is divided by R52 and R53 to input a base of the transistor Q4. Then, the transistor Q4 is activated such that current flows in coils of the relay RY13 connected to its collector lead, thereby the switch of the relay RY13 is in an ON state. When the switch of the relay RY13 is in the ON state, current flows in coils of the relay R16 such that the relay RY16 performs a switching operation to short an R phase AC power line and an N phase AC power line, thereby producing short current in AC power. Then, the CTs 26 and 28, and relays 30 and 32 detect the short current to operate the magnetic switches 18 and 20, the main circuit breaker 12 and the sub-circuit breakers 14 and 16 such that AC power is cut.

Meanwhile, in the leakage voltage detection unit 50, a leakage voltage detected by the leakage voltage sensor rods 41 and 42 is divided by resistors R1~R4, and limited between operation power VCC and −VCC by diodes D1 and D2. After that, the operational amplifier OP1 inputs the leakage voltage through the non-inverting lead to amplify it. The operational amplifier OP1 outputs the amplified leakage voltage to the full wave rectifying unit 52.

Namely, in the full wave rectifying unit 52, the amplified leakage voltage of the leakage voltage detection unit 50 is rectified in a negative full wave format using the amplifiers OP2 and OP3. The negatively rectified full wave voltage is inputted to an inverting lead of the operational amplifier of the leakage voltage discrimination unit 54.

In the case where the leakage voltage sensor rods 43 and 44 detect a leakage voltage under a preset voltage, if the resistance value of the variable resistor VR1 is set such that the negatively rectified full wave voltage is less than the reference voltage VREF, the operational amplifier OP4 inputs a positive voltage through its inverting lead and outputs a low level voltage through its output lead. The AND gate AN1 inputs the low level voltage from the operational amplifier OP4 via a diode D13 and a high level output voltage from the operation power generation unit 70, and outputs a low logic signal. The AND gate AN3 of the signal selection unit 55 inputs the low logic signal from the AND gate AN1 via a diode D24 and a logic signal from an inundation voltage sensing unit 56 via a diode D23, and outputs a low logic signal. Here, the output signals from the respective diodes D23 and D24 are shorted to the ground before inputting to the AND gate AN3. The low logic signal from the AND gate AN3 is applied to a base lead of the transistor Q3 via a resistor R23 in the first leak voltage and inundation signal output unit 58. Also, the low logic signal of the AND gate AN3 is applied to a base lead of the transistor Q2 through a resistor R24, an operational amplifier OP6, a diode D14, an AND gate AN4, and a resistor R27 in the second leakage voltage and inundation signal unit 60. Also, the low logic signal of the AND gate AN3 is applied to a non-inverting lead of an operational amplifier OP7 through a resistor R24, and then an output of the operation amplifier OP7 is inputted to a base of the transistor Q4 through a diode D25 and a resistor R52 in the third leakage voltage and inundation signal output unit 62. From the above connection of the electrical elements, the transistors Q2, Q3, and Q4 are all in an active state. Therefore, the relays RY11, RY12, and RY13 of the operation signal generation unit 47 are not driven.

On the other hand, if the leakage voltage sensor rods 41 and 42 detect leakage voltage over a preset voltage, since an output voltage from the full wave rectifying unit 52 is higher than the reference voltage VREF, the operational amplifier OP4 inputs a negative voltage through its inverting lead and outputs a high level voltage. The AND gate AN1 inputs the high level voltage from the operational amplifier OP4 via a diode D13 and a high level output voltge from the operation power generation unit 70, and outputs a high logic signal through its output lead.

The AND gate AN3 of the signal selection unit 55 inputs the high logic signal from the AND gate AN1 via a diode D24 and a logic signal from an inundation voltage sensing unit 56 via a diode D23, and outputs a high logic signal. Here, the output signals from the respective diodes D23 and D24 are shorted to the ground before inputting to the AND gate AN3. The high logic signal from the AND gate AN3 is divided by resistors R23 and R28 to then input a base lead of the transistor Q3. Then, the transistor Q3 is active such that current flows in coils of the relay RY11 connected to its collector lead, thereby the switch of the relay RY11 is in an ON state. When the switch of the relay RY11 is in the ON sate, current flows in coils of the relay RY14 such that the relay RY14 performs a switching operation to ground AC power line to the ground, thereby producing ground current. Then, the CTs 26 and 28, and relays 30 and 32 detect the ground current to operate the magnetic switches 18 and 20 the main circuit breaker 12 and the sub-circuit breakers 14 and 16 such that AC power is cut.

The high logic signal of the AND gate AN3 is charged in a capacitor C24 via a resistor R24. Here, the resistance value of the resistor R24 and the capacitance value of the capacitor C24 are set such that the RC time constant is 0.13 s. After 0.13 s lapses, the operational amplifier OP6 inputs the charge, or the high level signal, through the non-inverting lead, amplifies it based on an amplification ratio adjusted by a variable resistor VR3 and outputs a high level signal through its output lead to an AND gate AN4 via a diode D15. The high level signal through the AND gate AN4 is divided by resistors R27 and R28 to then input a base lead of the transistor Q2. Then, the transistor Q3 is activated such that current flows in coils of the relay RY12 connected to its collector lead, thereby the switch of the relay RY12 is in an On state. When the switch of the relay RY12 is in the ON state, current flows in coils of the relay RY15 such that the relay RY15 performs a switching operation to connect an R phase AC power line to an N phase AC power line through a core resistor R0, thereby producing transient current in AC power. Then, the CTs 26 and 28, and relays 30 and 32 detect the transient current to operate the magnetic switches 18 and 20, the main circuit breaker 12 and the sub-circuit breakers 14 and 16 such that AC power is cut.

Even if ground current or transient current is detected, in order to prevent a case where AC power is not cut by the magnetic switches 18 and 20, the main circuit breaker 12 and the sub-circuit breakers 14 and 16, the resistance value of a variable resistor VR4 is set to be larger than that of a variable resistor VR3. Then, the operational amplifier OP7 inputs the high level signal from the AND gate AN3 through its non-inverting lead through the resistor R24 and the capacitor C24, and outputs a low level signal before the high level signal from the AND gate AN3 is higher than a setting value previously set by the variable resistor VR4. If the high level signal HIGH from the AND gate AN3 is higher than a setting value previously set by the variable resistor VR4, the operational amplifier OP7 outputs a high level signal. If the variable resistor VR3 is set to a voltage, for example, 3V, inputted to the inverting lead of the operational amplifier OP6, the variable resistor VR4 preferably is set to a voltage, for example, 6V, inputted to the inverting lead of the operational amplifier OP7. Then, if 0.5 s lapses after the transistor Q2 is active, the transistor Q4 is active, too. The high level signal of the operational amplifier OP7 is divided by R52 and R53 to input a base of the transistor Q4. Then, the transistor Q4 is activated such that current flows in coils of the relay RY13 connected to its collector lead, thereby the switch of the relay RY13 is in an ON state. When the switch of the relay RY13 is in the ON state, current flows in coils of the relay R16 such that the relay RY16 performs a switching operation to short an R phase AC power line and an N phase AC power line, thereby producing short current in AC power. Then, the CTs 26 and 28, and relays 30 and 32 detect the short current to operate the magnetic switches 18 and 20, the main circuit breaker 12 and the sub-circuit breakers 14 and 16 such that AC power is cut.

Also, a leakage voltage sensing signal from the AND gate AN1 is applied to a Clock lead CLK of a D flip-flop U14B and an inundation sensing signal from the AND gate AN2 is applied to a Clock lead CLK of a D flip-flop U14A. Therefore, if a leakage voltage is detected over a preset voltage, since the D filp-flop U14B inputs a high signal through its clock lead CLK and outputs a high signal through its output lead Q to an LED D19. If an inundation voltage is detected, since the D filp-flop U14A inputs a high signal through its clock lead CLK and outputs a high signal through its output lead Q to an LED D18. The LED D18 or D19 is operated to show a leakage state or an inundation state according as a switch SW4 is pressed. Meanwhile, the D filp-flops U14A and U14B are reset according as a switch SW3 is pressed.

If a sensor is installed away from the metal post 100 by a distance of 1 m, 25V is detected. The power break apparatus of the present invention is designed to be operated, when detecting a range of a stride voltage and a touch voltage, for is example, 7~10V, thereby protecting passersby against electrical shock.

Figure 7:
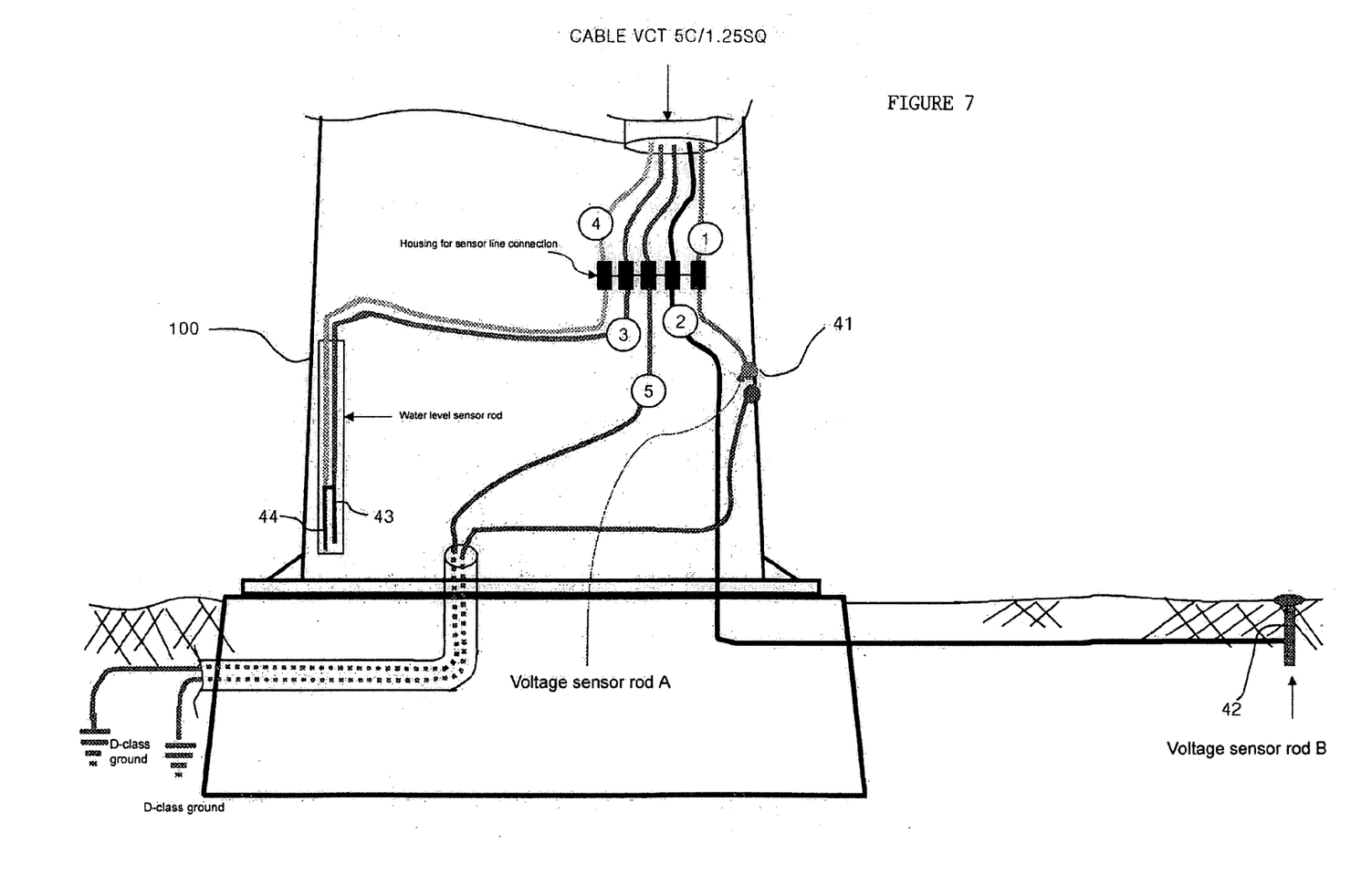
FIG. 7 is a schematic construction diagram illustrating installation states of voltage sensor rods 43 and 44, and inundation sensor rods 41 and 42 according to the present invention.

FIG. 7 is a schematic block diagram illustrating installation states of voltage sensor rods 43 and 44, and inundation sensor rods 41 and 42 according to the present invention.

The inundation sensor rods 41 and 42 are installed in the metal post 100 and located such that they are electrically connected to each other when the metal post 100 is inundated. The leakage voltage sensor rods 43 and 44 are installed at a location, such as at a metal post, under the ground apart from the metal post by a predetermined distance, so that they can detect leakage voltage from the metal post 100. Namely, the leakage voltage sensor rods 43 and 44 are installed such that one leakage voltage sensor rod 43 is connected to the metal post 100 and the other 44 is buried under the ground apart from the metal post 100 by a predetermined distance.

Also, an LED and resistor are installed between an R phase AC power line and the ground, indicating R phase of AC power according as the LED illuminates when AC power is supplied to streetlamps. Meanwhile, if the LED does emit lights while AC power is supplied to the streetlamps, the apparatus indicates that the LED is damaged or the R phase AC power line is not grounded.

Although the preferred embodiments of the present invention have not included various applications, the power break apparatus of the present invention can be applied to an application device such that one leakage voltage sensor rod 43 is connected to a ground terminal of electrical devices such as refrigerators, electrical washing machines, industrial equipment, etc., and other leakage voltage sensor rod 44 is connected to an electric outlet. Here, the leakage voltage sensor rods 43 and 44 are buried under the ground while being spaced from each other by a predetermined distance. Therefore, when transient current, leakage current, or short current is generated, the power break apparatus can break AC power supplied thereto.

Also, the power break apparatus of the present invention can be applied to an application in which a plurality of LEDs are installed in respective metal posts 100 and controlled to cycle on and off at a predetermined time interval, thereby preventing moving vehicles in the street from running into the metal posts in the dark. Here, the ON and OFF illumination operations of the LEDs are implemented by operations of an ON/OFF switch composed of a slide switch while rectified full wave voltage from the operation power generation unit 70 is supplied to an ON/OFF illuminating driver.

Meanwhile, the present invention can be implemented to include only one of the leakage voltage sensing unit and the inundation sensing unit, or other combinations thereof, etc. Therefore, the power break apparatus of the present invention can break AC power supplied to the metal posts if a leakage voltage is detected over a preset voltage by the leakage voltage sensing unit or if inundation of the metal posts is detected by the inundation sensing unit.

As mentioned above, the present invention detects inundation of electrical structures installed in the street or leakage voltage over a predetermined voltage from the electrical structures, and breaks AC power supplied to the electrical structures based on a result of the detection, thereby protecting passersby against electrical shock. More specifically, the present invention generates ground current if a metal post is inundated or a leakage voltage is detected over a preset voltage, and breaks AC power supplied to the metal post. If AC power supplied to a metal post is not cut based on ground current, the present invention generates transient current in AC power and breaks AC power. Also, if AC power supplied to a metal post is not cut based on ground current and transient current, the present invention shorts AC power to the ground such that AC power is cut. Therefore, the present invention can completely prevent electrical shock due to inundation of the metal posts and/or leakage voltage leaked from the metal posts.

Also, since the present invention is operated to first generate ground current and then to break AC power, it can reduce loss of AC power and abrasion of contact points of the relays.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power breaking apparatus for prevention of electrical shock, comprising:
    a leakage voltage sensor for sensing a leakage voltage, the leakage voltage sensor including a plurality of leakage voltage sensor rods;
    a power break signal generation unit for generating a ground current if the leakage voltage sensor sensed the leakage voltage, and producing transient and short current, in order, every time a predetermined time lapses;

a zero phase sequence current transformer (ZCT) and current transformer for detecting ground current, transient and short currents, which are generated according to operations of the power break signal generation unit;
a delay for performing a control operation to break the AC power if a zero phase sequence current transformer (ZCT) and current transformer detects the ground current, the transient current and the short current;
a circuit breaker for breaking the AC power according to a control of the relay; and
a magnetic switch for breaking the AC power according to a control of the relay.

2. The apparatus as set forth in claim 1, wherein leakage voltage sensor includes:
a leakage voltage detector for detecting a voltage between both ends of the leakage voltage sensor rods;
a full wave rectifying unit for rectifying the detected voltage of the leakage voltage detector in a negatively rectified full wave format; and
a leakage voltage determiner for comparing the detected voltage in the negatively rectified full wave format with a preset reference voltage, and determining a state of leakage voltage based on a result of the comparing.

3. The apparatus as set forth in claim 2, wherein the plurality of leakage voltage sensor rods are installed such that one leakage voltage sensor rod is connected to a metal post and another is laid under the ground apart from the metal post with a predetermined distance.

4. A power breaking apparatus for prevention of electrical shock, comprising:
a plurality of leakage voltage sensor rods for sensing a leakage voltage; a plurality of inundation sensor rods for sensing an inundation voltage;
a leakage voltage and inundation sensing unit for sensing the inundation voltage based on an operation of the plurality of inundation sensor rods, and the leakage voltage over a preset voltage, based on an operation of the plurality of the leakage voltage sensor rods;
a power break signal generation unit for generating a ground current if the inundation voltage of leakage voltage over the preset voltage is detected, and producing transient And short current, in order, every time a predetermined time lapses;
a zero phase sequence current transformer (ZCT) and current transformer for detecting the ground current, the transient current and the short current, which are generated by the power break signal generation unit;
a delay for performing a control operation to break the AC power if a zero phase sequence current transformer (ZCT) and current transformer detects the ground current, the transient current and the short current;
a circuit breaker for breaking the AC power according to a control of the relay; and
a magnetic switch for breaking the AC power according to a control of the relay.

5. The apparatus as set forth in claim 4, wherein the power break signal generation unit includes:
an operation signal generation unit for generating the ground current operation signal if the inundation voltage of leakage voltage over the preset voltage is detected, and producing the transient and short current operation signals, in order, every time the predetermined time lapses;
a ground current generation unit for generating ground current such that AC current flows into the ground based on the ground current operation signal;

a transient current generation unit for generating transient current of AC power based on the transient current operation signal; and
a short current generation unit for generating transient current of AC power based on the short current operation signal.

6. The apparatus as set forth in claim 5, wherein the leakage voltage and inundation sensing unit includes:
a plurality of leakage voltage detectors for detecting a voltage between both ends of the leakage voltage senor rods;
a full wave rectifying unit for rectifying the detected voltage of the plurality of leakage voltage detectors in a negatively rectified full wave format;
a reference voltage generation unit for generating positive and negative reference voltages for detecting inundation and leakage voltages, and applying the negative reference voltage to one of the plurality of inundation sensor rods;
an inundation voltage detection unit for applying the positive reference voltage to other inundation sensor rod, and detecting an inundation voltage (of a metal post) based on a voltage change between the two inundation sensor rods each of which inputs the positive and negative voltages;
a leakage voltage detection unit for comparing the detected voltage in the negatively rectified full wave format with the positive reference voltage of the reference voltage generation unit, and detecting a leakage voltage over a preset voltage based on a result of the comparing; and
a leakage voltage and inundation signal output unit for operating the power break signal generation unit if the leakage voltage over the preset voltage is detected or the inundation voltage is detected.

7. The apparatus as set forth in claim 6, wherein each of the transient and short current generation units includes a relay operating two switches to be associated each other.

8. The apparatus as set forth in claim 7, wherein the transient current generation unit protects connection of the magnetic switch and the circuit breaker, and prevents coil losses from transformer etc. installed in electric power transmission post when transient current occurs, such that connections of the relay receives R and N phase AC powers through a core resistor.

9. The apparatus as set forth in claim 4, wherein the plurality of leakage voltage sensor rods are installed such mat one leakage voltage sensor rod is installed with a predetermined distance apart from another.

10. A power breaking apparatus for prevention of electrical shock, comprising:
an inundation voltage sensor for sensing inundation voltage, the inundation sensing unit including a plurality of inundation sensor rods;
a power break signal generation unit for generating a ground current if the inundation leakage voltage sensor sensed the leakage voltage, and producing transient and short current, in order, every time a predetermined time lapses;
a zero phase sequence current transformer (ZCT) and current transformer for detecting ground current, transient and short currents, which are generated according to operations of the power break signal generation unit;
a delay for performing a control operation to break AC power if a zero phase sequence current transformer (ZCT) and current transformer detects the ground current, the transient current and the short current; a circuit breaker for breaking AC power according to a control of the relay; and a magnetic switch for breaking the power according to a control of the relay.

11. The apparatus as set forth in claim 10, wherein the plurality of leakage voltage sensor rods is installed with a predetermined distance from metal posts.

12. The apparatus as set forth in claim 10, further comprising a leakage breaker for performing an operation to break power to a streetlight, when ground current occurs, indicating that the streetlight has been inundated and thusly leakage currents has been flowing thereto.

13. The apparatus as set forth in claim 12, further comprising an LED (Light Emitting Diode) connected to the AC power line of R phase through a resistor connected serially thereto, such that the R phase of the AC power line can be confirmed.

14. The apparatus as set forth in claim 10, wherein one of the pluralities of leakage voltage sensor rods is installed such that one line from the leakage voltage sensor rods is connected to N phase and the other line from the leakage voltage sensor rods is connected to metal posts.

* * * * *